March 4, 1941.     W. H. STATLER     2,233,903
BRAKING SYSTEM
Filed July 6, 1939     2 Sheets-Sheet 1

Inventor
Walter H. Statler
By R. S. C. Dougherty
Attorney

March 4, 1941.  W. H. STATLER  2,233,903
BRAKING SYSTEM
Filed July 6, 1939   2 Sheets-Sheet 2

Inventor
Walter H. Statler.
By R. S. A. Dougherty.
Attorney

Patented Mar. 4, 1941

2,233,903

UNITED STATES PATENT OFFICE 2,233,903

BRAKING SYSTEM

Walter H. Statler, Bethlehem, Pa., assignor to Bethlehem Steel Company, a corporation of Pennsylvania Application July 6, 1939, Serial No. 283,007

5 Claims. (Cl. 188—153)

This invention relates to improvements in braking systems for mine cars and the like, and particularly to a braking system using the hydraulic principle in place of the mechanical brakes heretofore used in this environment.

It is an object of this invention to provide a hydraulic braking system for mine cars and similar vehicles which is rugged in construction and simple to operate.

It is a further object to provide such a hydraulic braking system by means of which brakes may be set and left so for extended periods of time without danger of the brake becoming released through leakage of the brake fluid or contraction thereof caused by changes in temperature.

The foregoing and other objects of my invention will be more clearly understood from the following description and claims together with the drawings in which Figure 1 is a plan view of a mine car showing the location therein of a master cylinder;

Figure 1:
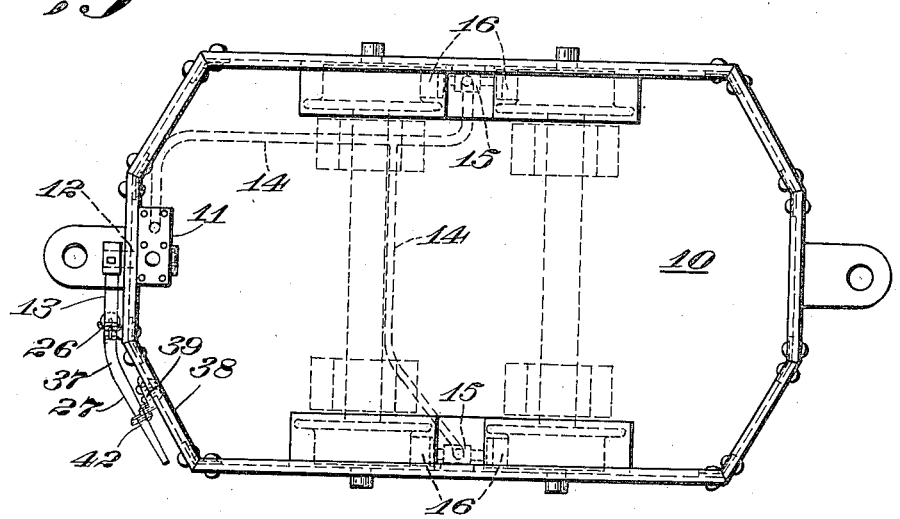

Referring to the drawings, 10 designates a mine car of the ordinary type. Positioned at one end of the car and interiorly thereof is master cylinder 11 which is secured to the end wall of the car. Shaft 12 extends from cylinder 11 through the end wall and at its other end is keyed to brake lever 13. Shown in dotted lines in Figure 1 are feed lines 14—14 for carrying the brake fluid from master cylinder 11 to slave cylinders 15.

Figure 2:
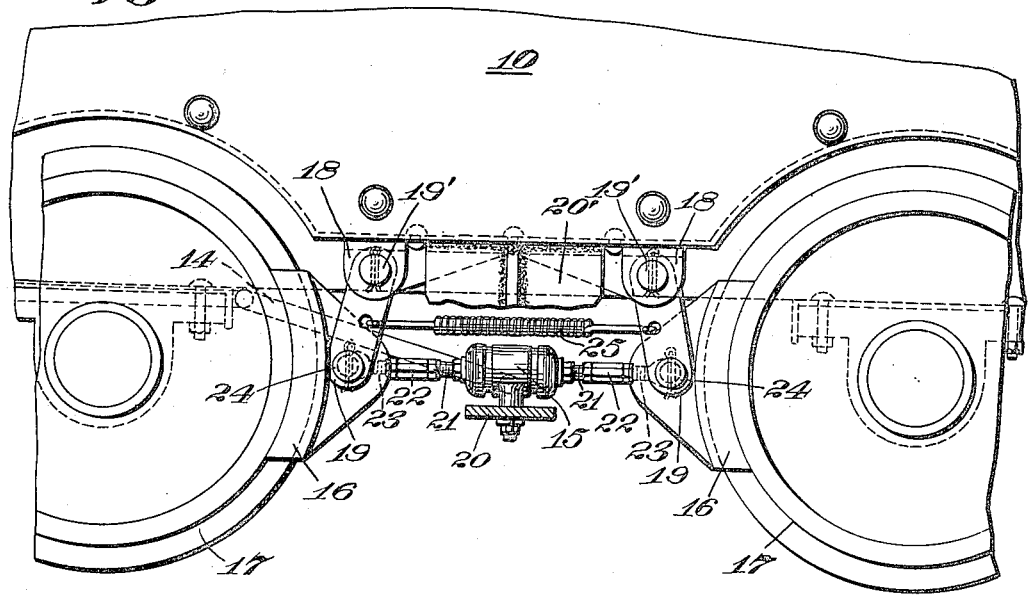
Fig. 2 is a partial elevation showing the position of the slave cylinders between the wheels.
Figure 3:
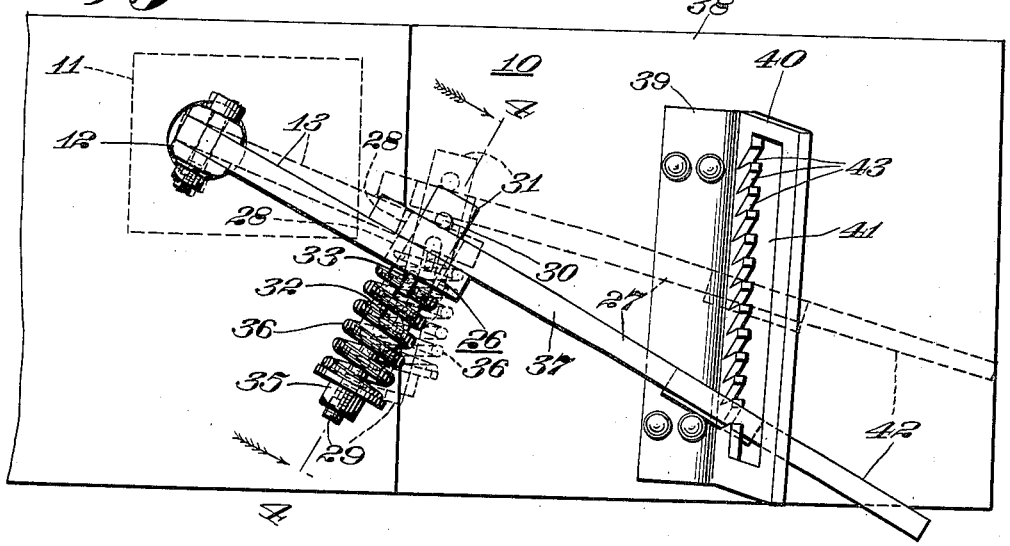
Fig. 3 is an end elevation showing the resilient lever means used to operate the brake.

Brake shoes 16 positioned adjacent wheels 17 of car 10 are suspended from brackets 18 by links 19, which are secured to brackets 18 by pins 19'. Positioned intermediate the brake shoes on each side of the car is a slave cylinder 15 which is carried by an inwardly-extending horizontal flange 20 on plate 20' which is shown in Figure 2 as partially broken away.

Piston rods 21 the heads of which are inside slave cylinder 15 are connected by adjusting nuts 22 to push rods 23 which in turn are connected to brake shoes 16 by pins 24. Piston rods 21 are adapted to be actuated by introduction into cylinder 15 of brake fluid. Also positioned intermediate links 19 and connected thereto at either end is tension spring 25. When the pressure on the braking system is released, spring 25 draws the brake shoes 16 out of engagement with wheels 17.

Mounted on the exterior of the end wall of car 10 and operatively connected to shaft 12 is the means, generally designated as 26, by which I operate the brake and make it effective over extended periods of time. This is one of the most important features of my invention.

Brakes on mine cars are very often left set for a number of hours. With a hydraulic brake system it was found that sometimes brake fluid would leak out of the system, or would contract due to a lowering of the temperature. In either case, with the ordinary rigid brake lever heretofore used, the result was that the brake was released. Since mine cars are often left standing on an incline, a releasing of the brake might have disastrous results. On the other hand, should the brake fluid tend to expand due to a rise in temperature, with the rigid brake lever the only escape for the fluid was through bursting the feed line, releasing the brake. I have overcome these difficulties by incorporating in the hydraulic braking system a resilient lever arrangement 26.

Resilient lever 26 is made up of brake lever 13, keyed at one end to shaft 12, and lever 27 superposed upon and overlapping the other end of lever 13. Openings 28—28 in levers 13 and 27 are in registry, and bolt 29 is loosely set in said openings. Horizontal pin 30 mounted in the head 31 of bolt 29 holds the bolt against downward movement. Mounted in slot 32 in bolt 29 is pin 33 having crimped ends 34 to prevent lateral movement of the pin. Mounted on bolt 29 between pin 33 and washer and nut 35 is compression spring 36 which tends to hold levers 13 and 27 in tight engagement.

As shown in Fig. 1, lever 27 is bent around the end of car 10 at 37. Secured to the diagonal portion 38 of the end wall of car 10 is angle 39, having its outwardly extending flange 40 cut out at 41. The outer or handle end 42 of lever 27 passes through the opening 41 in flange 40 and is adapted to engage any of notches 43 formed in flange 40 of angle 39.

The operation of my braking system is as follows:

When it is desired to apply the brake, the operator grasps the handle end 42 of lever 27 and raises it. This rotates shaft 12, exerting pressure on the fluid in master cylinder 11 and forcing fluid through feed lines 14—14 to slave cylinders 15. Fluid under pressure in the slave cylinders forces the heads of piston rods 21 outwardly and through push rods 23 the brake shoes 16 are forced into braking engagement with wheels 17. When the brake is released spring 25 draws the brake shoes out of engagement with the wheels. Adjusting nuts 22 are adapted to extend the reach of push rods 23 in order to make up for wear on the face of brake shoes 16.

Figure 4:
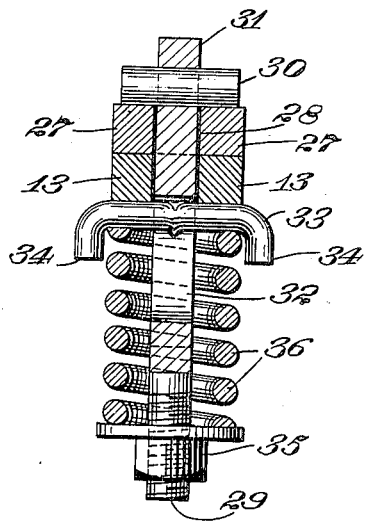
Fig. 4 is a section on the line 4—4 of Fig. 3.

My resilient lever arrangement functions as follows:

The lever 27 is pulled up until the fluid in the system can be compressed no further. The operator then forces the lever 27 upward another notch against the force exerted by spring 36. This position of the lever is shown in dotted lines in Fig. 4. If, while the brake is set, there is a reduction in the volume of fluid in the system, either through leakage or contraction, the force of spring 36 will push up lever 13 the required amount, thus holding the fluid under a constant and continuous pressure. On the other hand, should there be a sudden expansion of the fluid, the spring 36 will yield sufficiently to accommodate the increased volume of fluid in the system.

From the foregoing description it will be seen that I have succeeded in adapting the hydraulic braking system to the field of mine cars and like vehicles in such a way as to overcome the difficulties inherent in such an environment. While I have described my invention in considerable detail, I do not wish to be limited to the specific features thereof as it will be apparent that numerous variations thereof might be made without departing from the scope and spirit of my invention.

Having thus described my invention, what I claim as new and desire to secure by Letters Patent is:

1. In a fluid braking system for a vehicle having wheels and walls to constitute a compartment, a master cylinder within the compartment, slave cylinders controlled by the master cylinder, an extending member carried by the master cylinder, and means outside the compartment operative to actuate said extending member to apply the braking system to the wheels.

2. In a fluid pressure braking system for a vehicle having wheels and walls to constitute a compartment, a fluid pressure producing device within the compartment, a manually operative member actuating said device, and means outside the compartment to retain the manually operative member in an applied position.

3. In a fluid braking system for mine cars and the like, a master cylinder, a brake member, means operatively connecting the master cylinder to the brake member, a stop member, a lever for engaging the stop member to thereby operate the master cylinder, said lever being jointed and comprising a pivoted portion associated with the master cylinder, a catch portion associated with the stop member, and resilient means to retain said portions in operative relationship.

4. In a fluid pressure braking system for a vehicle having wheels, a master cylinder, brake members adjacent the wheels, slave cylinders to operate the brake members, means operatively connecting the master cylinder to the slave cylinders, and a resilient lever to actuate the master cylinder, said resilient lever comprising an outer end portion, an inner end portion overlapped by said outer end portion, openings in both said portions in registry with each other, a bolt passing through said openings, and a spring mounted on said bolt to hold said inner end and outer end portions in operative engagement.

5. In a braking system for a vehicle having a body mounted on wheels, a master cylinder within the vehicle body, wheel brakes having cylinders controlled by the master cylinder, an operating member carried by the master cylinder and extending to the exterior of the vehicle body, and means outside the vehicle body operative to actuate said operating member to apply the braking system.

WALTER H. STATLER.